US009651674B2

(12) United States Patent
McNamara et al.

(10) Patent No.: US 9,651,674 B2
(45) Date of Patent: May 16, 2017

(54) DEVICES, SYSTEMS AND METHODS FOR PROVIDING LOCATION INFORMATION OVER A CELLULAR NETWORK

(75) Inventors: Justin Michael Anthony McNamara, Atlanta, GA (US); John Potts Davis, III, Marietta, GA (US); Stephen Thomas Hardin, Suwanee, GA (US); Jay Daryl Rector, Loganville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 368 days.

(21) Appl. No.: 12/635,997

(22) Filed: Dec. 11, 2009

(65) Prior Publication Data

US 2011/0140962 A1 Jun. 16, 2011

(51) Int. Cl.
*G01S 19/25* (2010.01)
*G01S 19/12* (2010.01)
(Continued)

(52) U.S. Cl.
CPC ............... *G01S 19/25* (2013.01); *G01S 5/02* (2013.01); *G01S 5/0236* (2013.01); *G01S 19/12* (2013.01);
(Continued)

(58) Field of Classification Search
CPC ...... G01S 5/0027; G01S 5/009; G01S 5/0063; G01S 5/0263; G01S 19/12; G01S 19/256;
(Continued)

(56) References Cited

U.S. PATENT DOCUMENTS 5,854,605 A    12/1998  Gildea
6,061,561 A *   5/2000  Alanara .................. G01S 19/17
                                               455/456.1
(Continued)

FOREIGN PATENT DOCUMENTS

JP    H-06311093 A  * 11/1994  ............... H04B 7/26
WO   WO2008037332     4/2008

OTHER PUBLICATIONS

U.S. Appl. No. 12/631,930 Office Action dated Sep. 29, 2011.
(Continued)

*Primary Examiner* — Chuong P Nguyen
(74) *Attorney, Agent, or Firm* — Hartman & Citrin LLC

(57) ABSTRACT

The disclosure provides devices, systems, and methods for approximating the location of a mobile communication device. A base station transceiver (BTS) broadcasts assistance data across a control channel. The assistance data is received by a mobile communication device in communication with the BTS. The assistance data includes location information for the BTS, and Public Land Mobile Network (PLMN) information associated with the BTS. The assistance data can be broadcast by incorporating these fields in a control channel between the BTS and the mobile communication device. A-GPS devices correlate the received assistance data with a GPS almanac in order to connect to a set of positioning satellites. Devices without a GPS receiver or devices unable to connect to a satellite correlate the received assistance data to a known approximate location, by referring to a database stored on the device or on the network.

15 Claims, 9 Drawing Sheets

(51) Int. Cl.
*G01S 5/02* (2010.01)
*G01S 5/00* (2006.01)

(52) U.S. Cl.
CPC ............. *G01S 5/009* (2013.01); *G01S 5/0027* (2013.01); *G01S 5/0063* (2013.01)

(58) Field of Classification Search
CPC .......... G01S 19/48; G01S 5/02; G01S 5/0236; G01S 19/25
USPC ............... 342/357.2–357.78, 357.42–357.47; 701/468, 484, 485
See application file for complete search history.

(56) References Cited

U.S. PATENT DOCUMENTS

| | | | |
|---|---|---|---|
| 6,128,501 A * | 10/2000 | Ffoulkes-Jones | 455/456.3 |
| 6,295,454 B1 * | 9/2001 | Havinis et al. | 455/456.3 |
| 6,351,647 B1 * | 2/2002 | Gustafsson | H04W 4/02 455/414.3 |
| 6,433,735 B1 | 8/2002 | Bloebaum et al. | |
| 6,437,735 B1 * | 8/2002 | McMahan | 342/357.66 |
| 7,031,723 B2 | 4/2006 | Shamoto et al. | 455/456.1 |
| 7,064,706 B2 * | 6/2006 | King et al. | 342/357.44 |
| 7,072,666 B1 * | 7/2006 | Kullman | H04W 64/00 455/404.2 |
| 7,142,870 B2 * | 11/2006 | Kim | 455/456.1 |
| 7,180,445 B2 | 2/2007 | Martin | |
| 7,233,800 B2 * | 6/2007 | Laroia et al. | 455/456.1 |
| 7,254,388 B2 | 8/2007 | Nam | |
| 7,302,225 B2 | 11/2007 | Younis | |
| 7,319,878 B2 * | 1/2008 | Sheynblat | G01S 5/0036 455/404.2 |
| 7,359,712 B2 * | 4/2008 | Gutowski et al. | 455/456.1 |
| 7,383,049 B2 * | 6/2008 | Deloach et al. | 455/456.1 |
| 7,495,608 B1 * | 2/2009 | Chen et al. | 342/357.43 |
| 7,561,101 B1 * | 7/2009 | Tester et al. | 342/357.77 |
| 7,646,338 B2 | 1/2010 | Monnerat | |
| 7,672,675 B2 * | 3/2010 | Pande | G01S 5/0252 342/357.42 |
| 8,085,190 B2 * | 12/2011 | Sengupta et al. | 342/357.31 |
| 8,121,609 B2 * | 2/2012 | Bosnjakovic et al. | 455/456.1 |
| 8,446,320 B2 * | 5/2013 | Kuehnel et al. | 342/464 |
| 2002/0175854 A1 * | 11/2002 | Shioda | G01S 5/0263 342/357.25 |
| 2006/0041556 A1 * | 2/2006 | Taniguchi | G01C 21/3679 |
| 2006/0217130 A1 * | 9/2006 | Rowitch et al. | 455/456.1 |
| 2006/0290566 A1 * | 12/2006 | Syrjarinne et al. | 342/357.15 |
| 2007/0063890 A1 | 3/2007 | Yu | |
| 2007/0096981 A1 | 5/2007 | Abraham | |
| 2007/0132639 A1 | 6/2007 | Korneluk et al. | |
| 2007/0205942 A1 | 9/2007 | Xie et al. | |
| 2007/0232324 A1 * | 10/2007 | Kim et al. | 455/456.1 |
| 2007/0247354 A1 | 10/2007 | Garin | |
| 2008/0122690 A1 | 5/2008 | Wan et al. | |
| 2008/0129588 A1 | 6/2008 | Lundgren et al. | |
| 2009/0201202 A1 | 8/2009 | Young | |
| 2009/0264136 A1 | 10/2009 | Ische et al. | |
| 2010/0197239 A1 * | 8/2010 | Catovic et al. | 455/67.11 |
| 2010/0309044 A1 * | 12/2010 | Ische et al. | 342/357.28 |
| 2011/0039571 A1 * | 2/2011 | Bodine et al. | 455/456.1 |
| 2011/0133984 A1 | 6/2011 | Davis et al. | |

OTHER PUBLICATIONS

U.S. Appl. No. 12/631,930 Office Action dated Feb. 29, 2012.
U.S. Appl. No. 12/631,930 Office Action dated Jan. 31, 2014.
U.S. Appl. No. 12/631,930 Office Action mailed Oct. 29, 2014.

* cited by examiner

DEVICES, SYSTEMS AND METHODS FOR PROVIDING LOCATION INFORMATION OVER A CELLULAR NETWORK

BACKGROUND OF THE INVENTION

Field of the Invention

The present invention relates to Assisted Global Positioning Systems (A-GPS). More particularly, the present invention relates to providing assistance data to a mobile communication device.

Background of the Invention

Mobile communication devices are becoming increasingly ubiquitous. Cellular transceivers can be found in several portable and fixed devices that can further communicate over other types of networks. For instance, a cellular telephone can include a Global Positioning System (GPS) receiver as part of an Assisted GPS (A-GPS) system. To provide location information for a mobile communication device, a logic on the device queries the cellular network to obtain assistance data. The assistance data enables the GPS receiver to tune in to signals from a specific satellite or set of satellites. If the device is successfully able to calculate a geographical position from the received GPS signals, that location information can be applied to several location-based services, for instance, live weather, directions, security, and so on.

The query typically includes, inter alia, an identifier of a cell (Cell ID) that the device is communicating with. Assistance data in turn includes a list of satellites specific to the location of the cell, ephemeris information for each satellite, etc. Ephemeris information lists positions for specific satellites at a given time, and therefore turns obsolete in a few hours. Consequently, devices frequently query the network for assistance data. This consumes valuable resources such as bandwidth, channels, etc. Furthermore, the lack of a GPS signal can severely limit the functionality of these devices. If an A-GPS device is unable to calculate a location for a number of reasons, such as poor satellite reception, etc., an error message is returned, and the entire query fails. This means that all the data is needlessly transmitted in the user plane when it is not being used at the device.

What is needed is a technique for providing a location of a mobile communication device that is efficient and reliable.

SUMMARY OF THE INVENTION

The present invention addresses the above-identified problems by providing devices, systems, and methods for approximating the location of a mobile communication device. A base station transceiver (BTS) broadcasts assistance data across a control channel. The assistance data is received by a mobile communication device in communication with the BTS. The assistance data includes location information for the BTS, and Public Land Mobile Network (PLMN) information associated with the BTS. The assistance data can be broadcast by incorporating these fields in a control channel between the BTS and the mobile communication device. A-GPS devices correlate the received assistance data with a GPS almanac in order to connect to a set of positioning satellites. Devices without a GPS receiver or devices unable to connect to a satellite correlate the received assistance data to a known approximate location, by referring to a database stored on the device or on the network. The cell location can be correlated to an approximate location, and is useful for applications requiring moderate precision, without the need for a separate network query. The approximate location can also be useful for GPS positioning, as the mobile communication device may use an MCC, MNC, and LAC that is broadcast from the host cell to identify the proper satellites to search on according to the most recent almanac data stored on the mobile communication device.

In one exemplary embodiment, the present invention is a mobile communication device including a processor, a memory in communication with the processor, a location logic on the memory, and a transceiver in communication with the processor, wherein the location logic receives assistance data from a base transceiver station broadcast, derives an approximate location from the assistance data, and provides a service based on the approximate location. The device further includes a database stored on the memory, the database including a geographical location corresponding to the received assistance data. The location logic derives the approximate location by comparing the received assistance data with the corresponding geographical location in the database. The location logic can further correlate the approximate location with a GPS almanac to communicate with a GPS satellite. If the device fails to communicate with a GPS satellite, location logic derives an approximate location by comparing the received assistance data with a corresponding geographical location in a database, and provides the approximate location to a location requesting application on the memory.

In another exemplary embodiment, the present invention is a system for providing location information over a cellular network, the system including a mobile communication device, a base transceiver station in communication with the mobile communication device, a server logic in communication with the base transceiver station, the server logic transmitting assistance data to the mobile communication device via a base transceiver station broadcast, a location logic on the mobile communication device that derives an approximate location from the location data, and an application logic that provides a service based on the approximate location.

In yet another embodiment, the present invention is a method for providing location information over a cellular network, the method including receiving assistance data from a base station server broadcast, deriving an approximate location from the received assistance data, and providing a service based on the approximate location. The deriving further comprises comparing the received assistance data with a corresponding geographical identifier stored in a database. The method further includes correlating the assistance data with a GPS almanac, receiving a signal from a GPS satellite, and determining an exact location based in part on the signal from the GPS satellite.

DETAILED DESCRIPTION OF THE INVENTION

Figure 1:
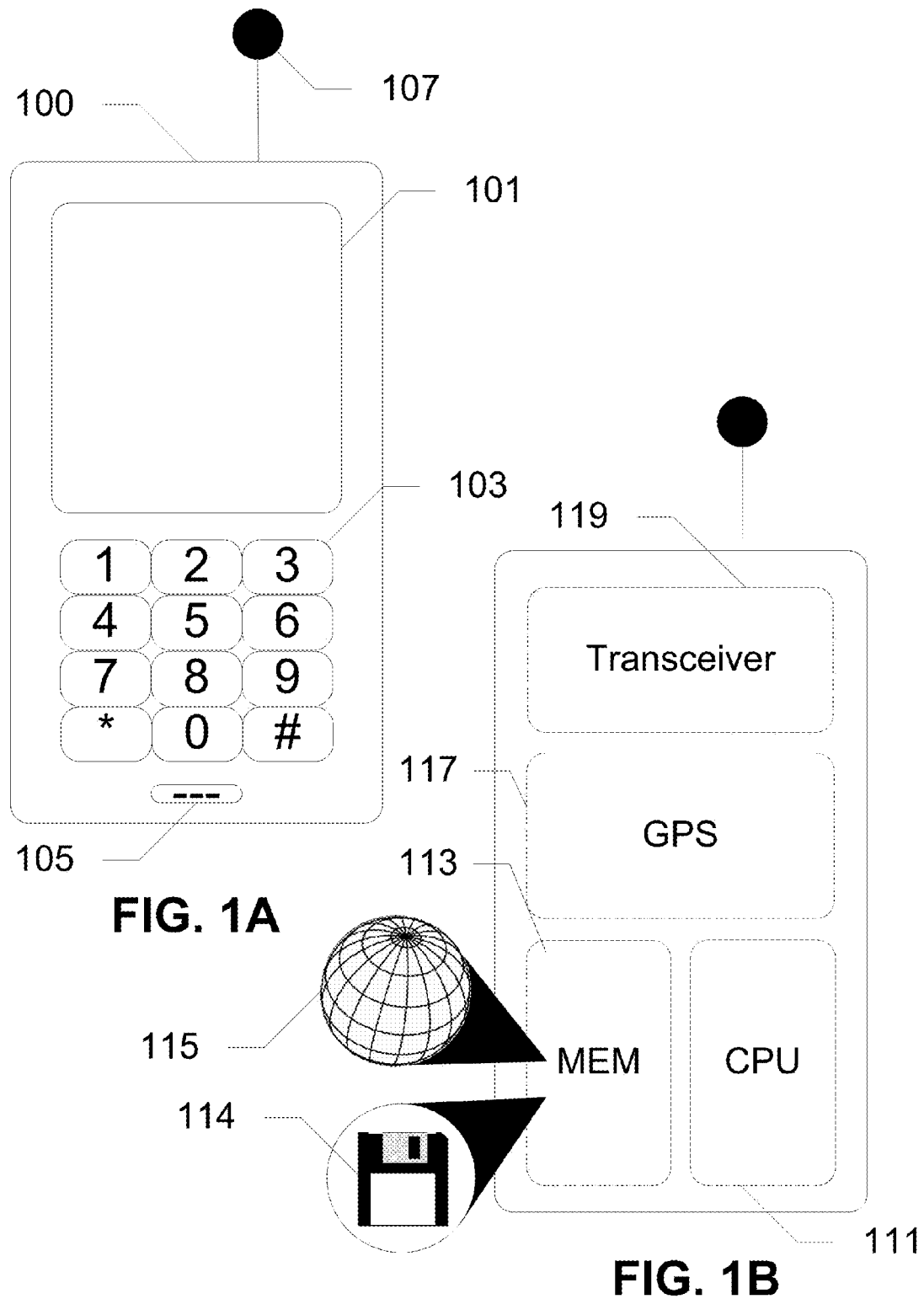
FIGS. 1A and 1B show a mobile communication device for approximating location, according to an exemplary embodiment of the present invention.

The following detailed description and figures disclose devices, systems, and methods for approximating the location of a mobile communication device. A base station transceiver (BTS) broadcasts assistance data across a control channel. The assistance data is received by a mobile communication device in communication with the BTS. The assistance data includes location information for the BTS, such as coordinates of the BTS, coordinates of a sector covered by the BTS, or any geographical information from a femtocell, etc. The coordinates are in the form (x,y) where 'x' indicates a latitude and 'y' indicates a longitude for the BTS or sector. The assistance data can further include Public Land Mobile Network (PLMN) information, such as a Mobile Country Code (MCC), Mobile Network Code (MNC), and a Location Area Code (LAC) associated with the BTS. The assistance data can be broadcast by incorporating these fields in a control channel between the BTS and the mobile communication device. The control channel broadcast includes cellular broadcast, broadcast SMS, data transaction, or equivalent broadcast from the network.

Mobile communication devices authorized to access the control channel can receive the assistance data. A-GPS devices correlate the received assistance data with a GPS almanac in order to connect to a set of positioning satellites. Devices without a GPS receiver or devices unable to connect to a satellite correlate the received assistance data to a known approximate location, by referring to a database stored on the device or on the network. Where the precise location is found, it can be used for any number of applications. Applications requiring more approximate locations can use the approximate location determined from the assistance data by a non-GPS device. Timely GPS almanac information can also be broadcasted on the control channel. This eliminates the need for the mobile communication device to query the network for this information, thus freeing device and network resources.

As the coordinates of the BTS or host sector are included in the broadcasted assistance data, the device has the option to use the host cell location as an approximate location, useful for applications requiring moderate precision. Providing the latitude and longitude of the host cell in the broadcast information also allows non-AGPS devices to utilize location services without a separate network query. Further, if GPS positioning is attempted but fails, the mobile communication device may alternatively provide on-board applications the coordinates of the host cell as a 'best available location' option. In one embodiment, the network can periodically broadcast GPS almanac information and its relative association with the MCC, MNC, and LAC of the carrier. This information is useful for GPS positioning, as the mobile communication device may use the MCC, MNC, and LAC that is broadcast from the host cell to identify the proper satellites to search on according to the most recent almanac data stored on the mobile communication device. As GPS almanac information is sometimes valid up to 180 days, this greatly reduces the amount of network traffic necessary as compared to a network transaction occurring for every GPS attempt, freeing up device and network resources. In other embodiments, the coordinates of the cell are made available to applications on the mobile communication device as a back-up in case of GPS failure. The coordinates enable provision of low accuracy information that may be valuable to applications that do not require high location precision.

"Mobile communication device", as used herein and throughout this disclosure, refers to any electronic device capable of wirelessly sending and receiving data. A mobile communication device may have a processor, a memory, a transceiver, an input, and an output. Examples of such devices include cellular telephones, personal digital assistants (PDAs), portable computers, etc. In one embodiment, a mobile communication device is a handheld GPS receiver. In another embodiment, a mobile communication device is a microcell or a femtocell. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile communication devices communicate with each other and with other elements via a network, for instance, a wireless network, or a wireline network. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of radio networks include cellular, GPRS, Wi-Fi, BLUETOOTH® networks, etc., with communication being enabled by hardware elements called "transceivers." Some mobile communication devices may have more than one transceiver, capable of communicating over different networks. For example, a cellular telephone can include a GPRS transceiver for communicating with a cellular base station, a Wi-Fi transceiver for communicating with a Wi-Fi network, and a GPS transceiver (GPS receiver) for receiving a signal from a positioning satellite. A network typically includes a plurality of elements that host logic for performing tasks on the network. In modern packet-based wide-area networks, servers may be placed at several logical points on the network. Servers may further be in communication with databases and can enable communication devices to access the contents of a database. A server can span several network elements, including other servers in the cellular network.

A Base Transceiver Station (BTS) includes a plurality of antennae, and facilitates communication between a mobile communication device and a network. In one embodiment, a Base Station Transceiver (BTS) includes three unidirectional antennae. Each antenna serves an area that is a sector or a part of a sector. A sector is an area served by one or more antennae from one or more BTS's. A BTS transmits assistance data to the mobile device across a control channel. Assistance data includes location information for the BTS and/or its antennae. Assistance data can be embedded in fields within a control channel. For instance, coordinates for a BTS can be embedded in the Cell ID field of a Broadcast Control Channel (BCCH). Other assistance data can be embedded in a BCCH, Common Control Channel (CCCH), or a Dedicated Control Channel (DCCH). Assistance data enables a device to ascertain a proximate location, or to tune into GPS signals to ascertain an exact location. A proximate location could range from a state, city within the state, locality, a BTS serving the locality, or a sector served by one of the antennae of the BTS. An exact location is as precise as can be allowed by the number and quality of signals provided by positioning satellites.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A and 1B show a mobile communication device for approximating location, according to an exemplary embodiment of the present invention.

FIG. 1A shows the external components of the mobile communication device 100, according to an exemplary embodiment of the present invention. Mobile communication device 100 includes display 101, keypad 103, microphone 105, and antenna 107. Display 101 is a liquid-crystal display (LCD) which gives a user of mobile communication device 100 a visual output. Keypad 103 is an alphanumeric arrangement of buttons which gives the user tactile input. Microphone 105 gives the user audio input so that the user may talk to the user of another mobile communication device, provide voice command input, or record sound.

FIG. 1B shows the internal components of mobile communication device 100, according to an exemplary embodiment of the present invention. Mobile communication device 100 includes processor (CPU) 111, memory 113 having location logic 114 and approximate location database 115, GPS chip 117, and transceiver 119. Processor 111 is preferably a mobile processor and performs calculations according to logic stored on memory 113. Memory 113 is a computer readable medium known as random access memory (RAM) which stores logic, user information, contact information, etc. Transceiver 119 is a cellular radio frequency (RF) transmitter and receiver which allows mobile communication device 100 to communicate wirelessly across a network. This enables mobile communication device 100 to share information with other electronic devices, issue and execute commands, etc. Location logic 114 is an algorithm which determines the location of mobile communication device 100 to the best accuracy with the given information. Approximate location database 115 is a database which, among other things, links received assistance data with approximate locations. Database 115 can also include a GPS almanac, linking locations and times to a plurality of GPS satellites.

Mobile communication device 100 can provide a service to the user through an application that requires a current location. A base transceiver station broadcasts assistance data. Mobile communication device 100 receives this assistance data through antenna 107. Transceiver 119 decodes the assistance data and forwards the assistance data to processor 111. Location logic 114 uses the assistance data to determine an approximate location of mobile communication device 100. The assistance data may take different forms, such as a longitude and latitude of the base transceiver station. This is given in the form of two numbers, one being the latitude and the other being the longitude. Location logic 114 uses these coordinates to approximate a location of mobile communication device 100. This can be done by referring to approximate location database 115. Once the approximate location is determined, location logic 114 uses the approximate location to instruct GPS receiver 117 as to which GPS satellites to receive signals from. Once an exact location is determined from signals from a set of satellites, a service can be provided based on the exact location. Services such as directions, weather, local sports scores, local places, etc., can be provided by different applications on memory 113.

In alternate embodiments, the mobile communication device does not have a GPS unit. In these embodiments, the assistance data is still used to approximate a location of the mobile communication device. However, the applications on the memory use this approximate location to provide a service. For many of the afore-mentioned services the result is the same. For instance the weather is not going to be drastically different between the approximate location and the exact location. Similarly, information on local business pages, such as yellow pages, and sports scores for local teams are the same across an approximate location. So long as the accuracy does not need to be less than the range of a base station sector, any approximate location-based service can use this location. In further embodiments the mobile communication device is a substantially simpler device, such as a standalone weather communicator, or a weather-reporting unit coupled to a multi-function device. In these embodiments the mobile communication device may not have a microphone or display. There may be limited applications on the memory, in many cases only one. These mobile communication devices receive broadcasts from the BTS and approximate a location using a location logic and an approximate location database. The application uses the approximate location or a GPS determined exact location to provide a service. In the case of a standalone weather communicator, a speaker can be used to audibly communicate the weather to the user periodically, or in the event of a warning.

Figure 2:
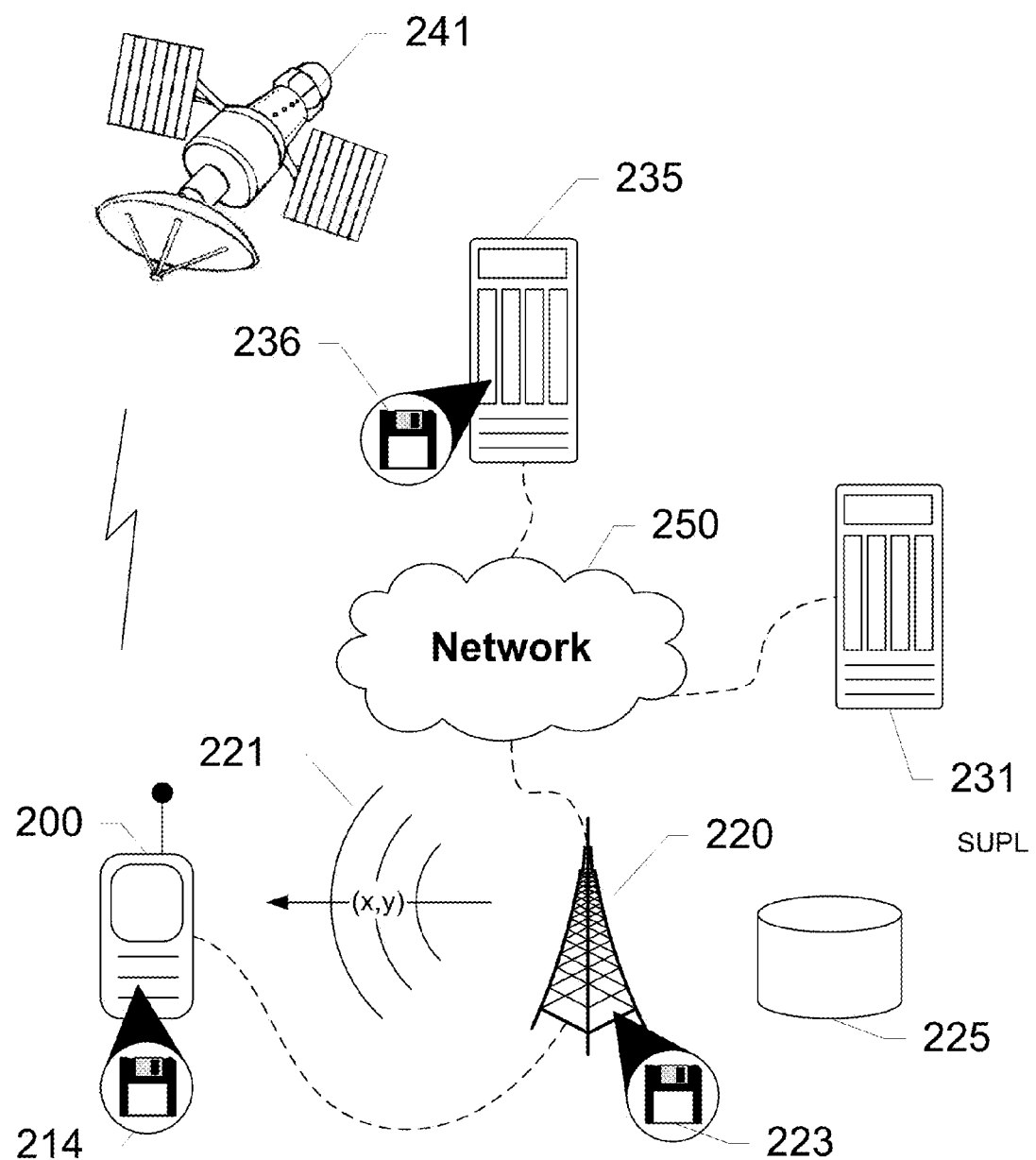
FIG. 2 shows a system for providing location information, according to an exemplary embodiment of the present invention.

FIG. 2 shows a system for providing location information, according to an exemplary embodiment of the present invention. A mobile communication device 200, including a location logic 214, is in communication with a base transceiver station (BTS) 220 having server logic 223 and assistance database 225. BTS 220 includes several components that communicate with and enable device 200 to communicate with network 250. Network 250 includes Secure User Plane Location (SUPL) server 231, and application server 235 having application logic 236. Mobile communication device 200 is also in communication with GPS satellite 241.

Mobile communication device 200 uses location logic 214 to determine an approximate location using assistance data. Assistance data may come from a control channel broadcast 221 received from base transceiver station 220, or from SUPL server 231. BTS logic 223 retrieves the assistance data from assistance database 225 which contains the latitude and longitude of the base transceiver station 220. Assistance data may also come from SUPL server 231. SUPL server 231 transmits the assistance data across the network to mobile communication device 200. Once mobile communication device 200 receives the assistance data, a location can be determined. Mobile communication device 200 uses location logic 214 to approximate a location. Once the location has been approximated mobile communication device 200 may send that information to application server 235, or may communicate with GPS satellite 241 in order to obtain a more exact location. Application logic 236 on application server 235 provides a service to mobile communication device 200. Application logic 236 needs to know the location of mobile communication device 200 in order to provide the service. Application logic 236 may provide general location-based services using an approximate location, such as a weather report, local business information, etc. Application logic 236 can also provide precise location-based services such as mapping, directions, etc.

In one exemplary embodiment using this system, a user of mobile communication device 200 uses an application that requests a location to provide a service. Base transceiver station 220 uses server logic 223 to broadcast the longitude and latitude through the control channel broadcast 221. Mobile communication device 200 receives a control channel broadcast 221 including assistance data. Mobile communication device 200 then uses the assistance data to determine an approximate location. From the approximate location mobile device 200 can request a service from application server 235 or connect to GPS satellite 241 for a more precise location.

Within the control channel, base transceiver station 220 may broadcast the assistance data in several formats. The cell ID may contain the assistance data in the form of a longitude and latitude, a zip code, etc. Ephemeris data may be broadcast through the control channel as well or downloaded directly from the GPS satellite 241. Alternately, a separate portion of the control channel may be used to broadcast the longitude and latitude along with the time of day and the ephemeris data for the closest GPS satellites 241. The broadcast information allows applications to have access to assistance data without having to perform a separate query to the network 250. If the mobile communication device 200 does not support GPS, then the mobile communication device 200 can still use the approximate location to provide a service. In some embodiments, an application is stored on the memory of the mobile communication device 200 instead of on the application server 235.

In another exemplary embodiment using this system, BTS 220 broadcasts an LAC, MNC, and MCC. Location logic 214 on mobile communication device 200 uses an approximate location database to match the LAC, MNC, and MCC with an approximate location. Once the approximate location is determined, mobile communication device 200 can request a service from application server 235 or communicate with GPS satellite 241 for a more accurate location.

In another exemplary embodiment using this system, mobile communication device 200 sends a request for assistance data to SUPL server 231. Base transceiver station 220 receives this request and adds to the request the cell ID, LAC, MNC, and MCC of base transceiver station 220, and the time of day (ToD) before forwarding it to SUPL server 231. SUPL server 231 determines the latitude and longitude of the BTS 220 from the cell ID or the LAC, MNC, and MCC. SUPL server 231 sends the latitude and longitude of the BTS 220 to mobile communication device 200, along with ephemeris data of an appropriate set of GPS satellites corresponding to the coordinates, including GPS satellite 241. However, in this embodiment, mobile communication device 200 is unable to connect to GPS satellite 241 or any other GPS satellite. For instance, mobile communication device 200 may be inside a building or elsewhere where there is no satellite communication. Mobile communication device 200 uses an approximate location database to match the longitude and latitude with an approximate location. The approximate location may be a city and state, a zip code, etc., depending on the type of location application server 235 requires. For instance, a weather application may require a zip code while a local news application may require a city and state.

Alternatively, mobile communication device 200 does not have GPS capability. In this case no attempt to communicate with GPS satellite 241 happens. However, the request for assistance data from the SUPL server 231 is exactly the same as the request for assistance data from a GPS-enabled mobile communication device. Mobile communication device 200 uses the latitude and longitude to determine an approximate location, and ignores the ephemeris data.

Figure 3:
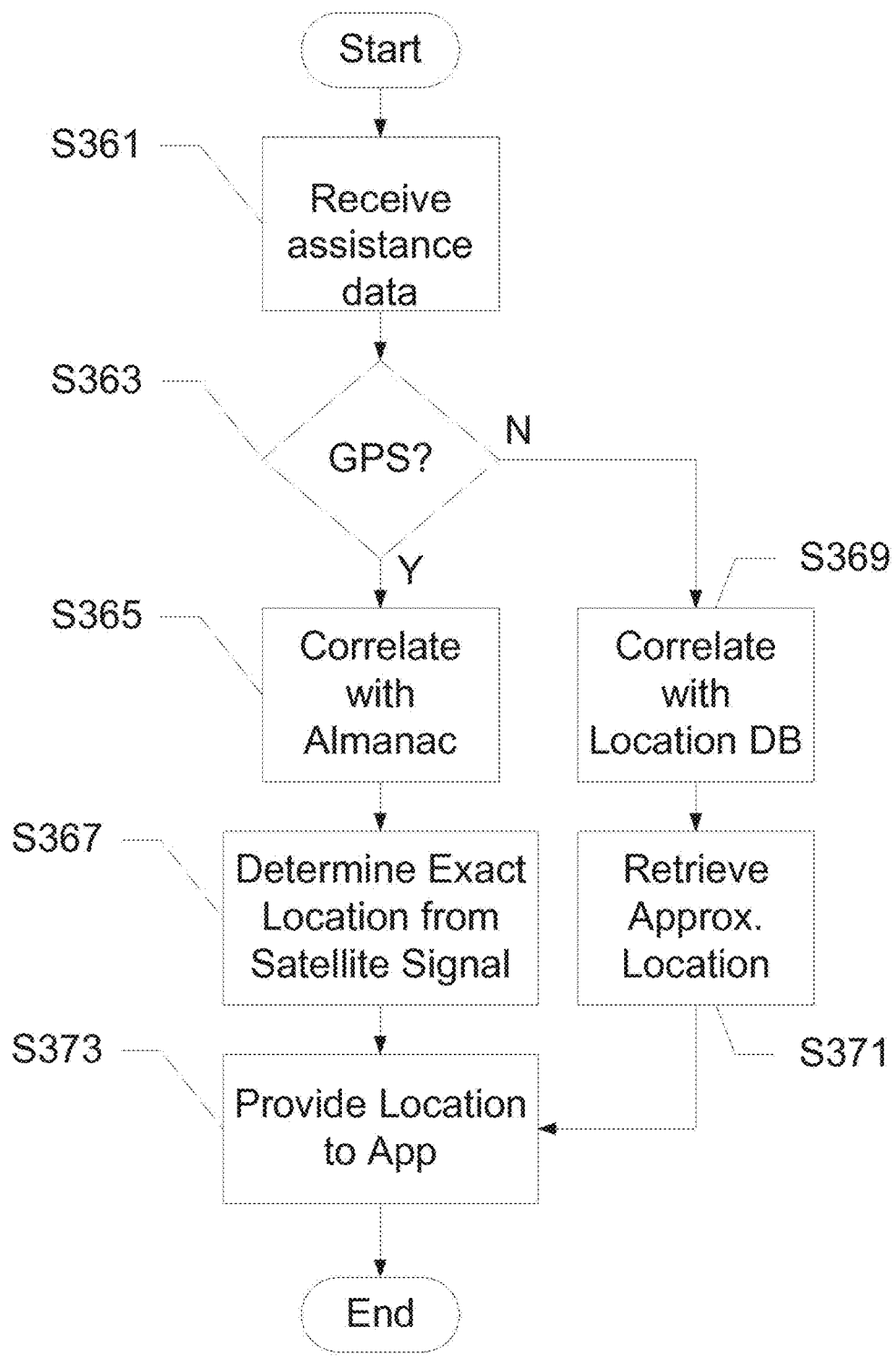
FIG. 3 shows a method for approximating location, according to an exemplary embodiment of the present invention.

FIG. 3 shows a method for approximating location, according to an exemplary embodiment of the present invention. The method starts when a mobile communication device is switched on, or when a communication link is established between the mobile communication device and a network. The mobile communication device receives assistance data S361. The assistance data may come from a SUPL server across a network or is broadcast from a base transceiver station. If the mobile communication device is GPS-enabled S363, then a GPS almanac is used to determine which GPS satellites to communicate with S365. The almanac is valid for approximately 180 days, and is updated and stored on the mobile communication device as needed. The mobile device correlates the assistance data with the almanac, and determines a set of satellites to look for when receiving GPS signals. Based upon the received GPS signals, an exact location of the mobile communication device is determined S367. However, if the mobile communication device is not GPS-enabled S363, then an approximate location database is used to determine an approximate location based on the assistance data S369. The approximate location database includes, for instance, a city/state, zip code, or equivalent geographic identifier that can be correlated with received assistance data. Once an approximate location is retrieved from the database, logic on the mobile communication device provides the approximate location into an application S373. The GPS-enabled mobile communication device similarly sends the exact location to the application S373.

In another embodiment, the mobile communication device is GPS enabled, but cannot acquire reliable GPS signals. In step S363, a determination is made that the GPS function does not work, or that a SUPL query has failed. In this case, the mobile communication device can follow steps S369 and S371 to provide an approximate location, as a "next-best alternative."

Figure 4:
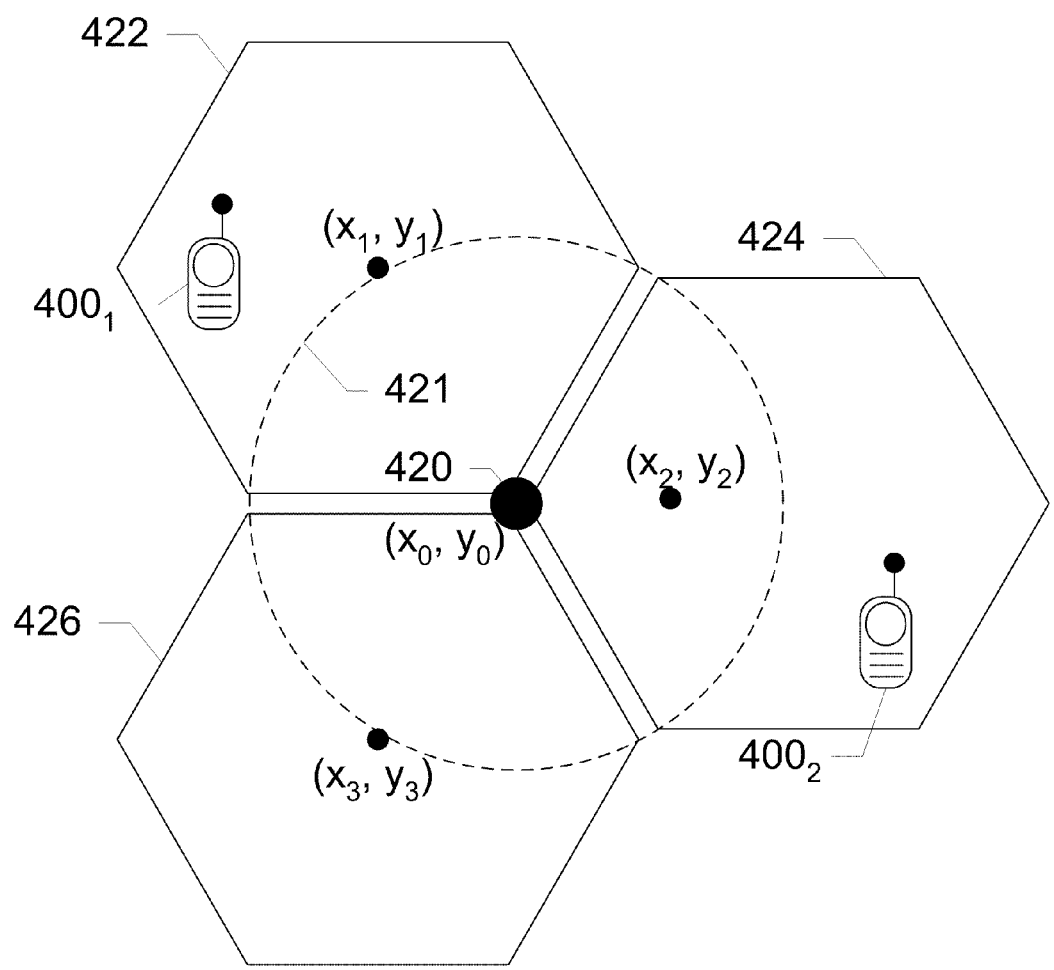
FIG. 4 shows the coordinates of a base transceiver station having three sector antennae, according to an exemplary embodiment of the present invention.

FIG. 4 shows the coordinates of a base transceiver station 420 having three sector antennae, according to an exemplary embodiment of the present invention. In this embodiment, three antennae are pointed one hundred and twenty degrees apart from one another, creating sectors 422, 424, and 426. Sectors are areas created by antennas from a plurality of base transceiver stations. For instance, sector 422 is defined not only by the antenna of BTS 420, but also by antennae of neighboring base stations, as is well-known in the art. Each sector has a center with a known location. The location depends on the range of the signal transmitted from the antenna, the direction of the antenna, physical features around the antenna, etc. Sector 422 has a center at $(x_1, y_1)$, sector 426 has a center at $(x_3, y_3)$, etc. Base transceiver station 420 also has a transmitting range 421 for each antenna. The center of this area within a sector is also known and may be provided. For instance, the center of the transmitting range of BTS 420 within sector 424 is located at $(x_2, y_2)$.

The location of base transceiver station 420 is also known, $(x_0, y_0)$. The center of a sector or center of a transmitting range likely provides a more accurate location for a mobile communication device 400, as mobile communication device 400 is likely closer to a center of a sector or transmitting range than base transceiver station 420. As the locations of base transceiver station 420, the centers of sector 424, sector 422, and sector 426 and the centers of BTS 420's transmitting range within these sectors are all known, any of these locations may be delivered to mobile communication device 400. For instance, because mobile communications device $400_1$ is located within sector 422 and the antenna for sector 422 is communicating with mobile communication device $400_1$, this antenna may communicate the location of base transceiver station 420, $(x_0, y_0)$, or may communicate the location of the center of sector 422, $(x_1, y_1)$, depending upon user or network configurations. Once mobile communication device $400_1$ receives coordinates, mobile communication device $400_1$ may use the coordinates in conjunction with an application, may look up appropriate satellite locations, etc.

In rural locations an omnidirectional antenna may be used. An omnidirectional antenna broadcasts the $(x_0, y_0)$ of the base transceiver station because it is the most accurate location the base transceiver station can provide.

Figure 5:
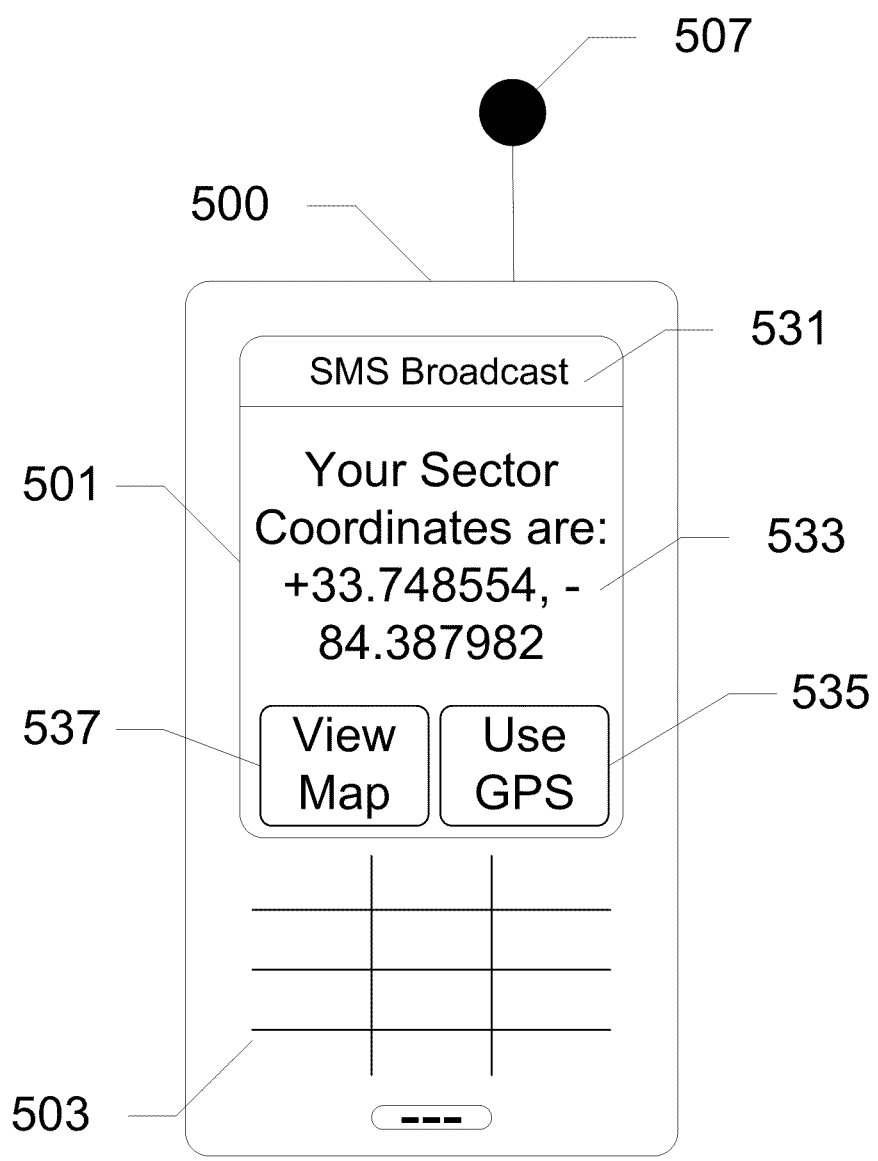
FIG. 5 shows a mobile communication device receiving an SMS broadcast from a base transceiver station, according to an exemplary embodiment of the present invention.

FIG. 5 shows a mobile communication device 500 receiving an SMS broadcast 531 from a base transceiver station, according to an exemplary embodiment of the present invention. In this embodiment, mobile communication device 500 includes a screen 501 and a keypad 503. Screen 501 is an LCD or LED screen on which a user can view selections, numbers, letters, etc. including SMS broadcast 531. Screen 501 can also be a touchscreen, allowing a user to select inputs directly on screen 501. Keypad 503 is typically used as an input device, for instance, to type a phone number, type a message, make a selection from screen 501, etc. In this screenshot, screen 501 is displaying SMS broadcast 531. SMS broadcast 531 is received from a base transceiver station across, for instance, a broadcast SMS channel. SMS broadcast 531 includes a message body 533, stating the coordinates of the center of the sector, the coordinates of the base transceiver station, etc. The coordinates are received from the base transceiver station along with SMS broadcast 531. The coordinates may be used by an application on mobile communication device 500, such as a map application. The coordinates and/or received assistance data can be used to launch other applications, using a view map selection 537, and a use GPS selection 535. View map selection 537, when selected, displays a map with the sector coordinates from message body 533 and a surrounding area. This informs the user of their approximate location. Use GPS selection 535, when selected, uses the coordinates of message body 533 to locate appropriate GPS satellites. The coordinates of message body 533 are compared with an approximate location database on a memory of mobile communication device 500 to determine the location of the GPS satellites at that specific time and place. The table includes approximately where each GPS satellite will be at a certain time with respect to the location of the coordinates. The information on the table may be periodically updated from the network, such as ephemeris data and GPS almanac data. Other assistance data may be provided with the SMS broadcast 531 and extracted for use by other applications.

Additional selections may also be possible on SMS broadcast 531. For instance, a view weather selection may allow the user to view local weather based upon the coordinates of message body 533. This can involve correlating the coordinates with an approximate location database to retrieve an approximate location. For instance, a movie times selection allows the user to view show times and locations based upon theaters located near a zip code, wherein the zip code is derived by inputting the coordinates of message body 533 into an approximate location database. Many other possible selections will be apparent to one of ordinary skill in the art in light of this disclosure.

Figure 6:
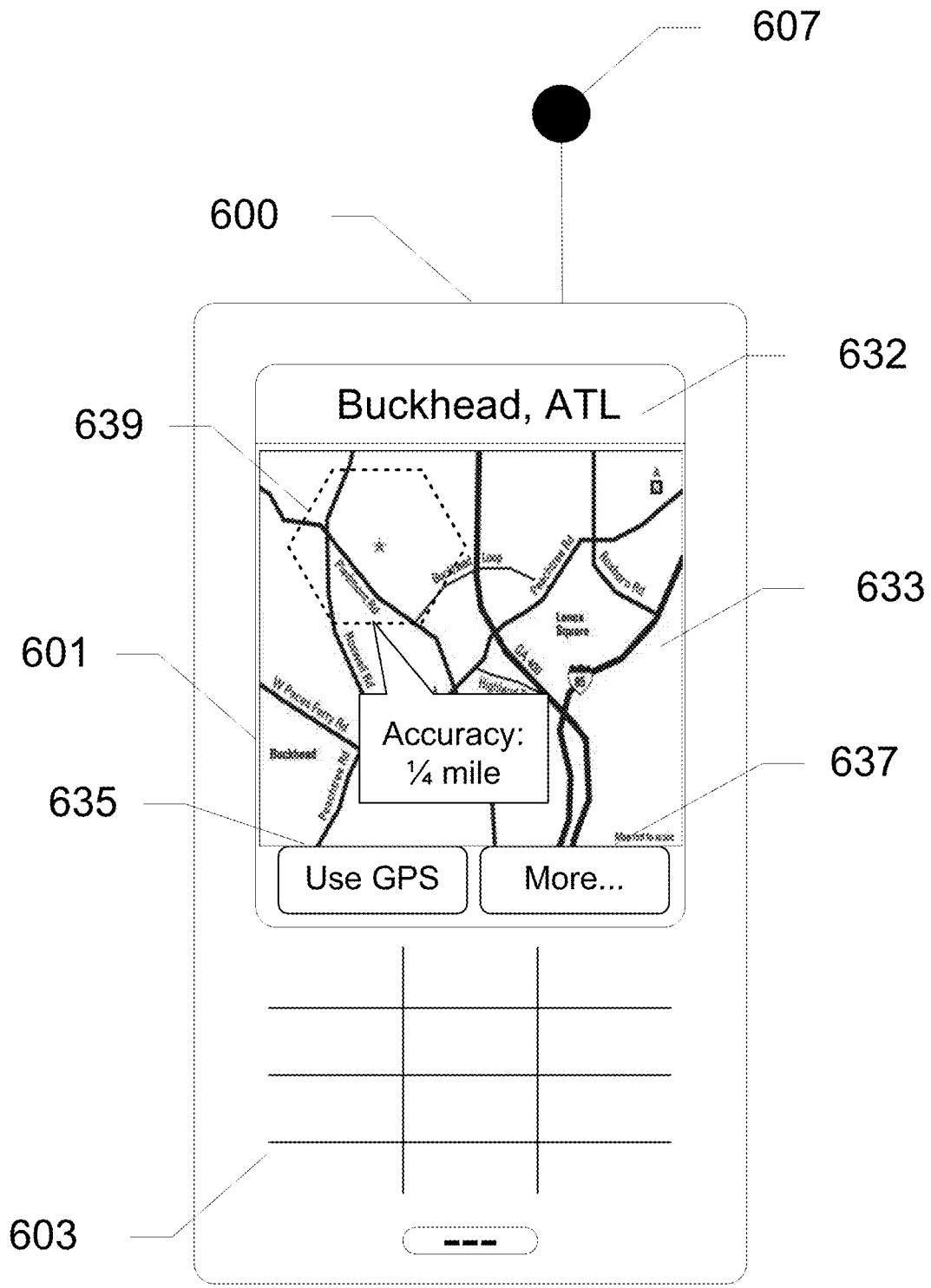
FIG. 6 shows a mobile communication device displaying a current approximate location, according to an exemplary embodiment of the present invention.

FIG. 6 shows a mobile communication device 600 displaying a current approximate location 632, according to an exemplary embodiment of the present invention. In this embodiment, mobile communication device 600 includes a display 601 and a keypad 603. Keypad 603 allows a user to make selections from display 601. Display 601 visually outputs location notification 632, which includes a map 633 indicating an approximate location 639, defined at the center of a radius of uncertainty. Although the approximate location 639 is indicated by a hexagon, reflecting the shape of a cell, other regions can be defined based upon a configuration of BTS's and associated antennae. A use GPS selection 635 and a more options selection 637 provide added functions.

Map 633 shows an area surrounding a coordinate set sent from a base transceiver station. Map 633 may be zoomed in or out using keypad 603 as input or a touchscreen embodiment of display 601. Map 633 may be a road map, topographical map, traffic map, weather map, etc. The approximate location with radius of uncertainty 639 is shown on map 633. The approximate location in this case is the neighborhood of Buckhead, within the city of Atlanta, Ga. This information is derived by correlating the coordinates sent from the base transceiver station with a map or database of the region or country, stored in an approximate location database on mobile communication device 600. The radius of uncertainty 639 approximates a sector of a network in which mobile communication device 600 is located. The BTS communicates with the mobile communication device 600, but the exact location is not determined because no GPS signals are received. Therefore, the BTS transmits the location where the center of cellular coverage is, and applies a radius of uncertainty 639 substantially encompassing the entire coverage area for the corresponding antenna. Location notification 632 may include an indication of the accuracy of the location and/or radius of uncertainty 639.

Use GPS selection 635, when selected, uses the coordinates sent from the base transceiver station to locate appropriate GPS satellites. The coordinate set, or an approximate location derived from the coordinate set, is compared with a GPS almanac and ephemeris data on a memory of mobile communication device 600 to determine the location of the GPS satellites at that specific time and place. The GPS almanac and ephemeris data includes approximately where each GPS satellite will be at a certain time with respect to the location of the coordinates. The information may be periodically updated from the network. More options selection 637, when selected, allows the user to select from different applications that utilize the coordinates. These applications include location-based services, such as a weather forecast, local business search, etc.

There are many applications which utilize the coordinates or the approximate location derived from the coordinates. Applications may reside wholly on a mobile communication device, wholly on a server, or any combination thereof. The server may be an application server on a service provider's network, a web server on the INTERNET, etc. Applications utilize the coordinates/approximate location of the mobile communication device for any information related to an area including the cell. The area may be a neighborhood, a town, a city, a county, a state, a zip code, an area code, etc. The user information derived from the area may be news, weather, business search results, business coupons, disaster warnings, events, etc.

Figure 7:
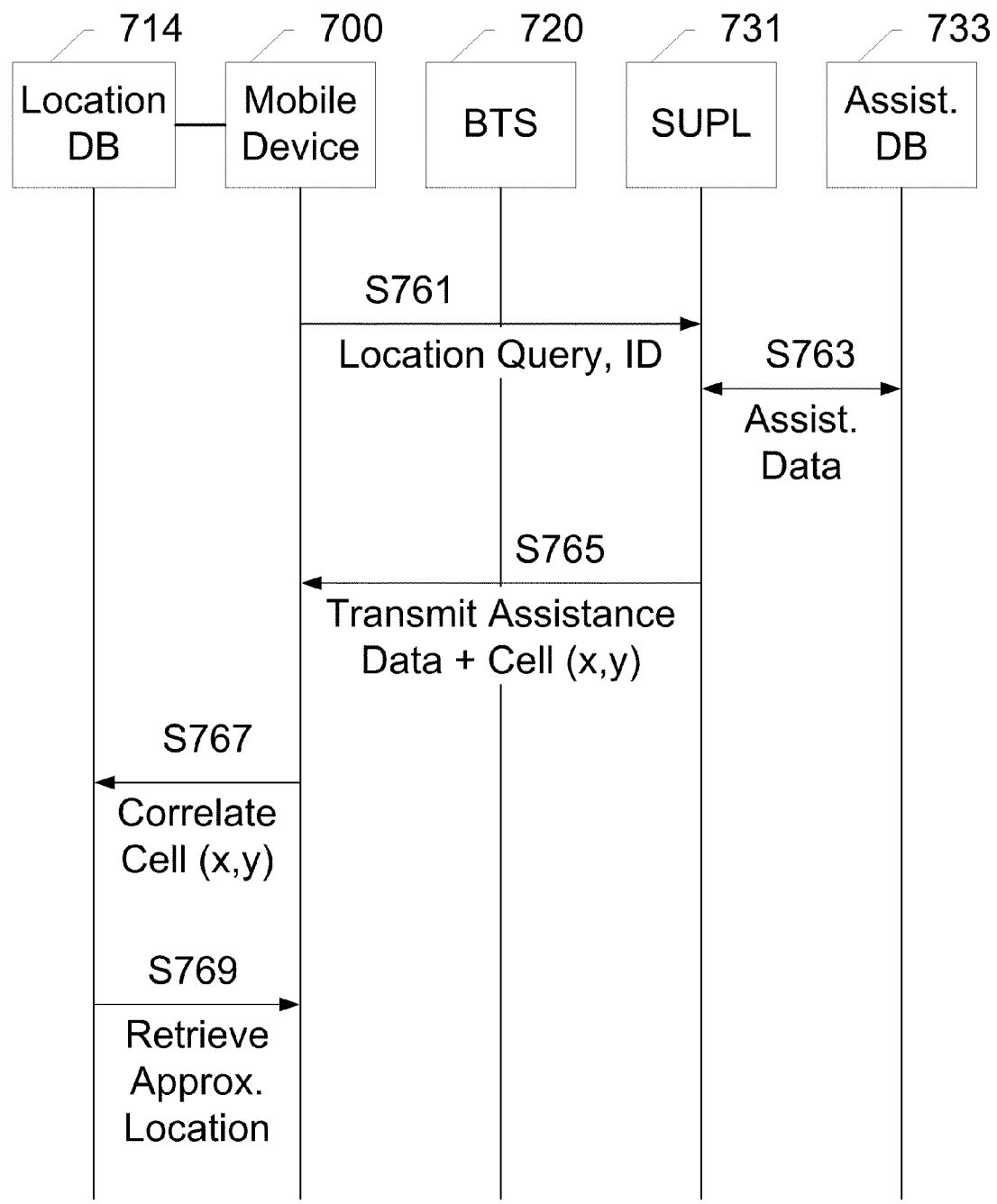
FIG. 7 shows an action diagram for providing an approximate location, according to an exemplary embodiment of the present invention.

FIG. 7 shows an action diagram for providing an approximate location, according to an exemplary embodiment of the present invention. In this embodiment, a mobile communication device 700, is in communication with a location database 714 that is stored locally. Other network elements include a base transceiver station (BTS) 720, a secure user plane location (SUPL) server 731, and an assistance database 733. When a user of mobile communication device 700 or an application on mobile communication device 700 requires location data, mobile communication device 700 transmits a location query along with an identification of mobile communication device 700 through BTS 720 to SUPL server 731, S761. When BTS 720 forwards this request the cell ID and ToD are included. SUPL server 731 receives the request and further requests assistance data from assistance database 733 which sends back assistance data to SUPL server 731, S763. The assistance data may include the (x, y) coordinates of BTS 720, the (x, y) coordinates of a center of a cellular sector, the locations of GPS satellites based upon the (x, y) coordinates and the time, ephemeris data of those GPS satellites, etc. SUPL server 731 transmits S765 the assistance data and the (x, y) coordinates to mobile communication device 700 through BTS 720. Mobile communication device 700 correlates S767 the (x, y) coordinates with location database 714. Correlation S767 includes placing the received coordinates on a map, correlating the coordinates with a zip code for an application, etc. Location database 714 retrieves an approximate location based upon the (x, y) coordinates and sends S769 this approximate location to mobile communication device 700.

As mentioned herein, a mobile communication device sometimes is unable to connect to any GPS satellite, or unable to determine a precise location. The present invention provides for a backup option using an approximate location. For instance, when a mobile communication device is inside a building or elsewhere where there is no satellite communication, it uses an approximate location database to match the longitude and latitude received in the broadcast with an approximate location.

Figure 8:
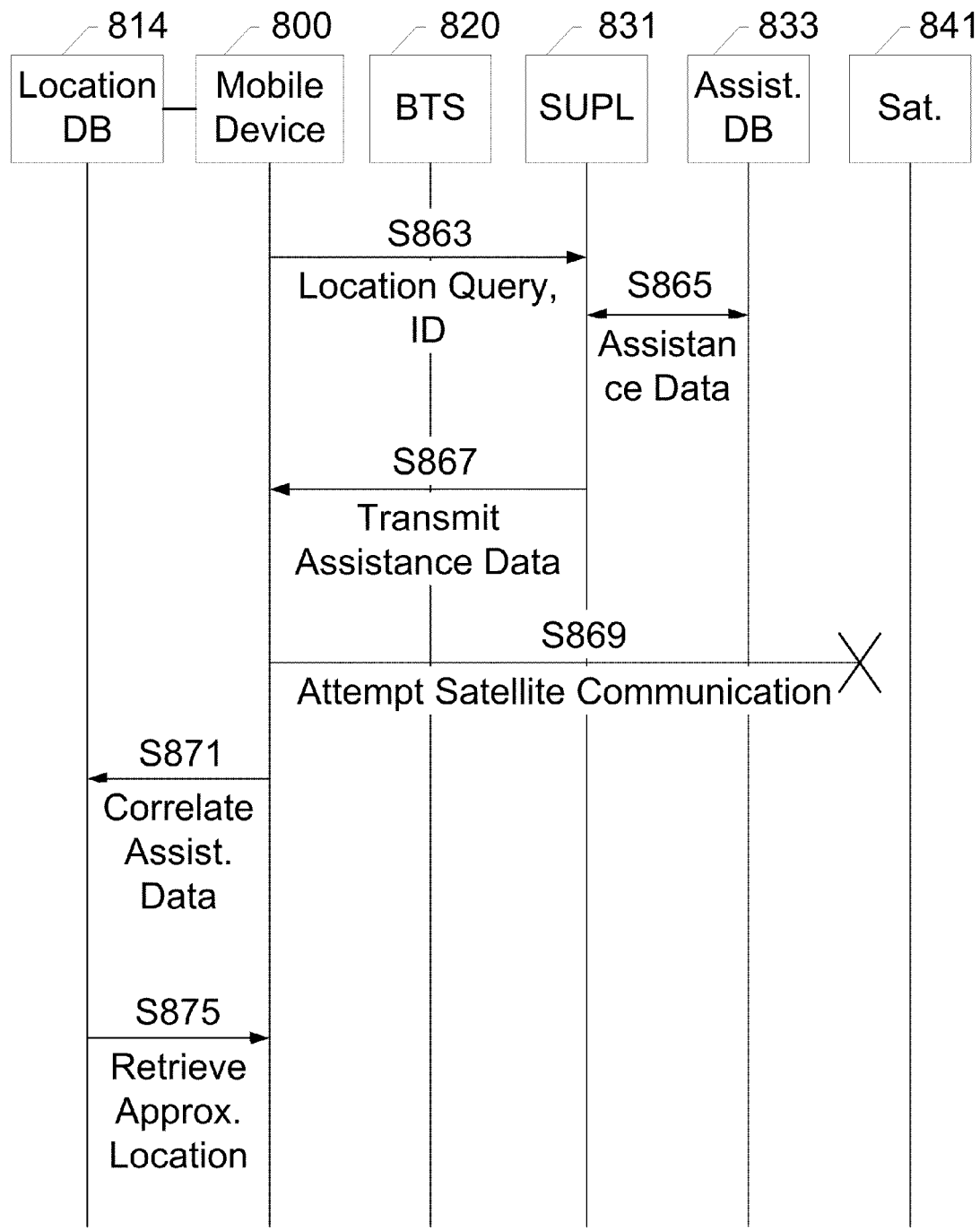
FIG. 8 shows an action diagram for providing an approximate location in response to a failed GPS fix, according to such an exemplary embodiment of the present invention.

FIG. 8 shows an action diagram for providing an approximate location in response to a failed GPS fix, according to such an exemplary embodiment of the present invention. In this embodiment, steps of the method occur between a mobile communication device 800, a location database 814 on mobile communication device 800, a base transceiver station (BTS) 820, a secure user plane location (SUPL) server 831, an assistance database 833, and a GPS satellite 841. When a user of mobile communication device 800 or an application on mobile communication device 800 requires location data, mobile communication device 800 sends S863 a location query along with an identification of mobile communication device 800 through BTS 820 to SUPL server 831. SUPL server 831 receives the request and further requests S865 assistance data from assistance database 833 which sends back S865 assistance data to SUPL server 831. The assistance data includes the (x, y) coordinates of BTS 820, the (x, y) coordinates of a center of a cellular sector, the locations of GPS satellites based upon the (x, y) coordinates and the time, etc. SUPL server 831 transmits S867 the assistance data and the (x, y) coordinates to mobile communication device 800 via BTS 820.

Mobile communication device 800 then attempts S869 to communicate with GPS satellite 841 using the locations of GPS satellites provided by assistance database 833. However, this communication S869 fails. The failure occurs because mobile communication device 800 does not have a proper view of GPS satellite 841. This may occur, for instance, because mobile communication device 800 is located within a structure such as a building, or because the weather prevents a good satellite fix. According to the present embodiment, even if the communication with GPS satellite 841 failed, mobile communication device 800 correlates S871 the provided assistance data with location database 814. This includes, for instance, placing the coordinates on a map, correlating the coordinates with a zip code for an application, etc. Location database 814 retrieves an approximate location based upon the (x, y) coordinates and sends S875 this location to mobile communication device 800. The approximate location is in the form of a place name, zip code, or equivalent geographic identifier, and is used for several applications requiring limited precision, such as weather, weather, etc.

Figure 9:
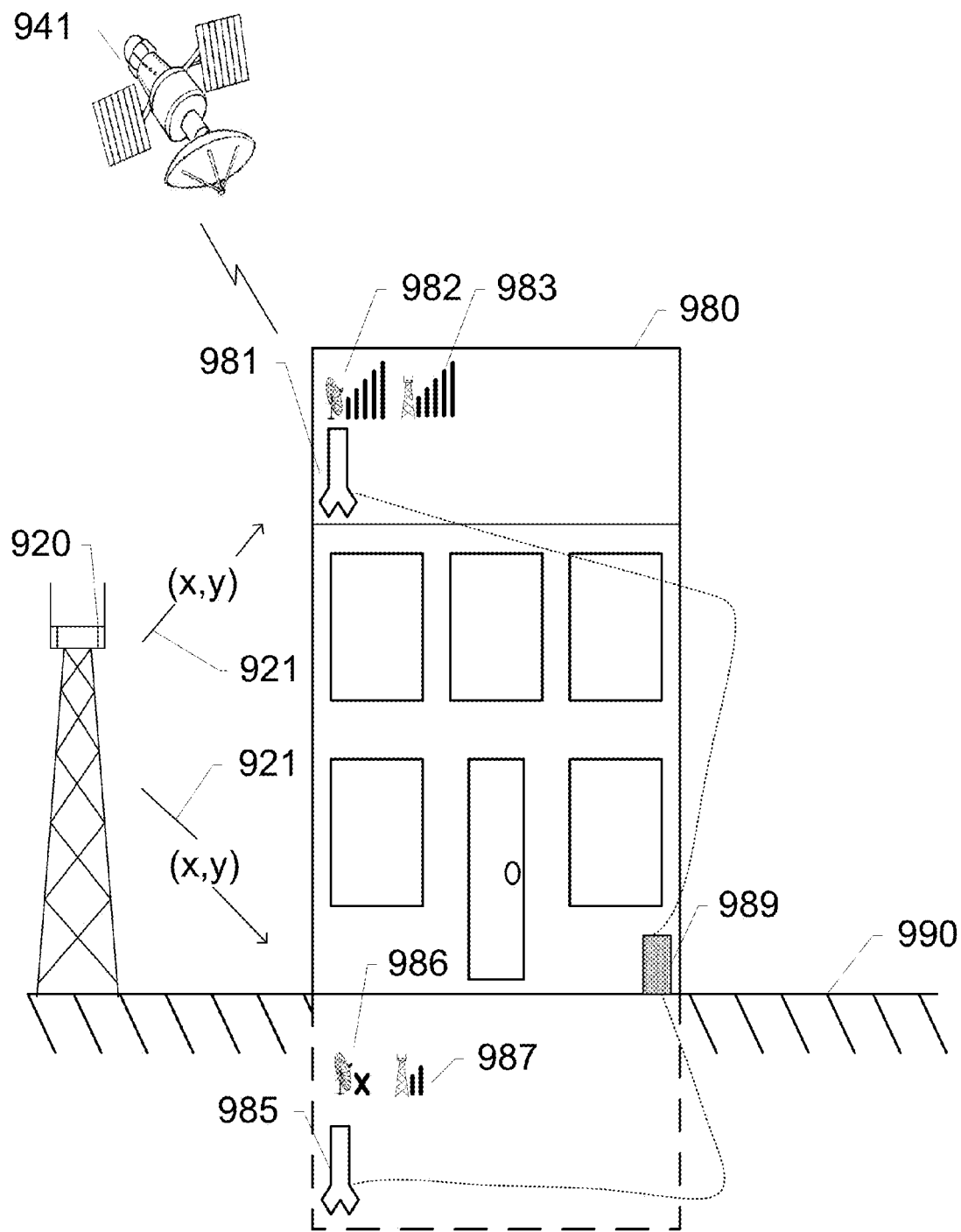
FIG. 9 shows a system for providing location information to a microcell, according to an exemplary embodiment of the present invention.

FIG. 9 shows a system for providing location information to a microcell, according to an exemplary embodiment of the present invention. In this embodiment, the system includes a base transceiver station (BTS) 920 transmitting assistance data via broadcasts 921, a GPS satellite 941, a microcell 981 within a building 980, and a microcell 985 in a basement of building 980. Microcell 981 and microcell 985 are essentially localized BTS's configured to provide a cellular signal within a constrained area, such as a home or small business. Microcells 981 and 985 are similar to femtocells, and are able to provide improved cellular signal performance for both voice calls and cellular data applications. Microcell 981 and microcell 985 connect to components of a wide-area network via an existing broadband Internet service (such as DSL or cable) through connection 989. Microcell 981 and microcell 985 further require a GPS link to verify the device location during the initial startup.

Microcell 981 and microcell 985 may also act similar to a mobile communication device to receive a cellular signal 921 including coordinates of BTS 920. Microcell 981 and microcell 985 therefore include a memory and processor and can store and further send these coordinates to mobile communication devices. Microcell 981 and microcell 985 may be used similar to BTS 920 to send assistance data to a mobile communication device.

Microcell 981 is located near the roof of building 980. Microcell 981 has a good GPS signal as indicated by bars 982 and also receives assistance data broadcast 921 well as indicated by bars 983. Thus, microcell 981 may use and further provide to mobile communication devices either the GPS location of microcell 981 from GPS satellite 941 or an approximate location from BTS 920. As signals from microcells generally are only strong enough for a building and possibly some surrounding area, the approximate location provided from BTS 920 also approximates the location of mobile communication devices using the microcells.

Conversely, microcell 985 is located in the basement of building 980 below ground 990. Microcell 985 is unable to communicate with GPS satellite 941, as indicated by no signal 986. Consequently, an exact location of microcell 985 is not known. Microcell 985 does however weakly receive cellular signal 921 from BTS 920, as indicated by bars 987. Therefore, microcell 985 is able to receive assistance data broadcast 921 from BTS 920. Broadcast 921 includes the coordinates of BTS 920, and is therefore enables microcell 985 to derive an approximate location by referring to a locally stored location database. The derived approximate location can be sufficient verification that microcell 985 is appropriately located at setup. Then microcell 985 can forward the approximate location to mobile communication devices connecting to microcell 985. Therefore, using microcell 981 or microcell 985, mobile communication devices can receive approximate locations for use with onboard applications, even in environments where GPS signals are non-existent.

According to embodiments of the present invention, a mobile communication device receiving a broadcast transmission that identifies the serving cell (and thus the phone) may be located in Europe and use this information to decide to use the Galileo satellites rather than GPS. Thus, the present invention may use broadcast network identifiers to determine an appropriate satellite technology/constellation.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A mobile communication device comprising:
a processor;
a global positioning system unit; and
a memory that stores an approximate location database comprising an application for providing a location-based service, a global positioning system almanac, and geographical locations, the memory further storing instructions that, when executed by the processor, cause the mobile communication device to perform operations comprising:
receiving, via a control channel of a base transceiver station, assistance data broadcast by the base transceiver station, the assistance data comprising a longitude and a latitude of the base transceiver station,
comparing the longitude and the latitude of the base transceiver station with the geographical locations stored in the memory, the geographical locations associated with a plurality of location types comprising a city, a state, and a zip code,
determining, based on comparing the longitude and the latitude of the base transceiver station with the geographical locations and further based on a location type requested by the application providing the location-based service, a geographical location of the geographical locations that corresponds to the longitude and the latitude of the base transceiver station and that matches the location type requested by the application providing the location-based service,
retrieving, from the approximate location database, the geographical location that corresponds to the longitude and the latitude of the base transceiver station and that matches the location type requested by the application providing the location-based service,
using the geographical location that corresponds to the longitude and the latitude of the base transceiver station and that matches the location type requested by the application providing the location-based service as a location of the mobile communication device,
comparing the location of the mobile communication device with the global positioning system almanac stored in the approximate location database to determine a plurality of global positioning system satellites for receiving global positioning system signals,
after the plurality of global positioning system satellites for receiving global positioning system signals is determined, failing to connect to any of the plurality of global positioning system satellites, and
in response to failing to connect to any of the global positioning system satellites, providing, to the application providing the location-based service, the location of the mobile communication device, wherein the application providing the location-based service uses the location of the mobile communication to provide the location-based service.

2. The mobile communication device of claim 1, wherein the assistance data further comprises a time of day.

3. The mobile communication device of claim 1, wherein the longitude and the latitude of the base transceiver station comprises coordinates of a sector covered by the base transceiver station.

4. The mobile communication device of claim 1, wherein the longitude and the latitude of the base transceiver station comprises at least one of coordinates of a center of a sector covered by the base transceiver station or coordinates of a center of a transmitting range of the base transceiver station.

5. The mobile communication device of claim 1, wherein the control channel is a short message service broadcast channel.

6. The mobile communication device of claim 1, further comprising a display and wherein the operations further comprise:
displaying, via the display, the longitude and the latitude of the base transceiver station; and providing, via the display, an option that, when selected, causes a map associated with the longitude and the latitude of the base transceiver station to be displayed via the display.

7. A method comprising:
receiving, by a mobile communication device via a control channel of a base transceiver station, assistance data broadcast by the base transceiver station, the assistance data comprising a longitude and a latitude of the base transceiver station, the mobile communication device comprising a processor, a global positioning system unit, and a memory that stores an approximate location database comprising an application for providing a location-based service, a global positioning system almanac, and geographical locations;
comparing, by the processor, the longitude and the latitude of the base transceiver station with the geographical locations stored in the memory, the geographical locations associated with a plurality of location types comprising a city, a state, and a zip code;
determining, by the processor, based on comparing the longitude and the latitude of the base transceiver station with the geographical locations and further based on a location type requested by the application providing the location-based service, a geographical location of the geographical locations that corresponds to the longitude and the latitude of the base transceiver station and that matches the location type requested by the application providing the location-based service;
retrieving, by the processor, from the approximate location database, the geographical location that corresponds to the longitude and the latitude of the base transceiver station and that matches the location type requested by the application providing the location-based service;
using the geographical location that corresponds to the longitude and the latitude of the base transceiver station and that matches the location type requested by the application providing the location-based service as a location of the mobile communication device;
comparing, by the processor, the location of the mobile communication device with the global positioning system almanac stored in the approximate location database to determine a plurality of global positioning system satellites for receiving global positioning system signals;
after the plurality of global positioning system satellites for receiving global positioning system signals is determined, failing, by the processor, to connect to any of the plurality of global positioning system satellites; and
in response to failing to connect to any of the plurality of global positioning system satellites, providing, by the processor, to the application providing the location-based service, the location of the mobile communication device, wherein the application providing the location-based service uses the location of the mobile communication to provide the location-based service.

8. The method of claim 7, wherein the longitude and the latitude of the base transceiver station comprises at least one of coordinates of a center of a sector covered by the base transceiver station or coordinates of a center of a transmitting range of the base transceiver station.

9. The method of claim 7, wherein the control channel is a short message service broadcast channel.

10. The method of claim 7, further comprising:
displaying, via a display of the mobile communication device, the longitude and the latitude of the base transceiver station; and
providing, via the display, an option that, when selected, causes a map associated with the longitude and the latitude of the base transceiver station to be displayed via the display.

11. A non-transitory computer-readable medium storing an approximate location database comprising an application for providing a location-based service, a global positioning system almanac, geographical locations, and instructions that, when executed by a mobile communication device comprising a processor, cause the processor to perform operations comprising:
receiving, via a control channel of a base transceiver station, assistance data broadcast by the base transceiver station, the assistance data comprising a longitude and a latitude of the base transceiver station;
comparing the longitude and the latitude of the base transceiver station with the geographical locations stored in the memory, the geographical locations associated with a plurality of location types comprising a city, a state, and a zip code;
determining, based on comparing the longitude and the latitude of the base transceiver station with the geographical locations and further based on a location type requested by the application providing the location-based service, a geographical location of the geographical locations that corresponds to the longitude and the latitude of the base transceiver station and that matches the location type requested by the application providing the location-based service;
retrieving, from the approximate location database, the geographical location that corresponds to the longitude and the latitude of the base transceiver station and that matches the location type requested by the application providing the location-based service
using the geographical location that corresponds to the longitude and the latitude of the base transceiver station and that matches the location type requested by the application providing the location-based service as a location of the mobile communication device;
comparing the location of the mobile communication device with the global positioning system almanac stored in the approximate location database to determine a plurality of global positioning system satellites for receiving positioning system signals;
after the plurality of global positioning system satellites for receiving global positioning system signals is determined, failing to connect to any of the plurality of global positioning system satellites; and
in response to failing to connect to any of the plurality of global positioning system satellites, providing, to the application providing the location-based service, the location of the mobile communication device, wherein the application providing the location-based service uses the location of the mobile communication to provide the location-based service.

12. The non-transitory computer-readable medium of claim 11, wherein the assistance data comprises a time of day and a cell identifier.

13. The non-transitory computer-readable medium of claim 11, wherein the longitude and the latitude of the base transceiver station comprises at least one of coordinates of a center of a sector covered by the base transceiver station or coordinates of a center of a transmitting range of the base transceiver station.

14. The non-transitory computer-readable medium of claim 11, wherein the control channel is a short message service broadcast channel.

15. The non-transitory computer-readable medium of claim 11, wherein the operations further comprise:
- displaying, via a display of the mobile communication device, the longitude and the latitude of the base transceiver station; and
- providing, via the display, an option that, when selected, causes a map associated with the longitude and the latitude of the base transceiver station to be displayed via the display.

* * * * *